United States Patent [19]
Ricciardi et al.

[11] Patent Number: 5,848,728
[45] Date of Patent: Dec. 15, 1998

[54] MULTI-FLIGHTED NOTCHED METERING AUGER

[75] Inventors: Ronald J. Ricciardi, Woodcliff Lake; Paul Matarazzo, Oakland, both of N.J.

[73] Assignee: Acrison, Inc., Moonachie, N.J.

[21] Appl. No.: 744,919

[22] Filed: Nov. 7, 1996

[51] Int. Cl.⁶ ....................................................... B67D 5/08
[52] U.S. Cl. ................................ 222/63; 222/413; 366/90
[58] Field of Search ................................. 222/56, 63, 77, 222/413, 58; 366/90

[56] References Cited

U.S. PATENT DOCUMENTS

| | | |
|---|---|---|
| 179,149 | 6/1876 | Barnes . |
| 582,272 | 5/1897 | Desgoffe et al. . |
| 1,319,004 | 10/1919 | Jackson et al. . |
| 1,626,734 | 5/1927 | Hunt . |
| 2,309,418 | 1/1943 | Schweickart et al. . |
| 2,680,879 | 6/1954 | Schnuck et al. . |
| 2,896,253 | 7/1959 | Mol . |
| 3,570,654 | 3/1971 | Hill . |
| 3,595,627 | 7/1971 | Abbott et al. . |
| 3,652,064 | 3/1972 | Lehnen et al. . |
| 3,666,386 | 5/1972 | McElroy et al. . |
| 3,672,641 | 6/1972 | Slaby . |
| 3,690,623 | 9/1972 | Boyne . |
| 3,804,298 | 4/1974 | Ricciardi .................................... 222/56 |
| 3,812,985 | 5/1974 | Lindeborg et al. . |
| 4,106,841 | 8/1978 | Vladic ................................. 339/176 M |
| 4,201,485 | 5/1980 | Walker . |
| 4,206,841 | 6/1980 | Lundgren . |
| 4,304,054 | 12/1981 | Nauck . |
| 4,400,175 | 8/1983 | Rathjen et al. . |
| 4,401,612 | 8/1983 | Nehmey et al. . |
| 4,480,927 | 11/1984 | Peat et al. . |
| 4,720,047 | 1/1988 | Knight et al. . |
| 4,863,364 | 9/1989 | Grimminger et al. . |
| 4,957,372 | 9/1990 | Meyer . |
| 5,056,925 | 10/1991 | Klein . |
| 5,178,461 | 1/1993 | Taniguchi . |
| 5,184,754 | 2/1993 | Hansen ....................................... 222/56 |
| 5,215,374 | 6/1993 | Meyer . |
| 5,304,054 | 4/1994 | Meyer . |
| 5,356,281 | 10/1994 | Katsuno et al. . |
| 5,480,070 | 1/1996 | Wallner et al. ........................... 222/413 |
| 5,524,796 | 6/1996 | Hyer ........................................ 222/413 |

OTHER PUBLICATIONS

Abstract of Japan publication No. 08026453 A, dated Jan. 30, 1996. *Patent Abstracts of Japan*, vol. 092, No. 005, May 31, 1996.

Abstract of Japan publication No. 03232610 A A, dated Jan. 16, 1991. *Patent Abstracts of Japan*, vol. 016, No. 010 (M-1199), Jan. 13, 1992.

*Primary Examiner*—Philippe Derakshani
*Attorney, Agent, or Firm*—Orrick, Herrington & Sutcliffe, LLP

[57] ABSTRACT

An auger is provided for discharging a uniform flow of material, particularly dry solids, through a feeding system. The auger has a shaft and at least one flight extending outward from the shaft for delivering a flow of material from a first end to a second end of the shaft. The flight has at least one notch in its outer perimeter proximate to the second end of the shaft. The auger may be used in a material feeding system having a supply hopper and a discharge conduit mounted to a feed trough. The auger is disposed in the trough and extends into the discharge conduit. The auger is rotated by a motor to drive the material from the feed trough through the discharge spout. The speed of the motor (and hence the feed rate of the material) may be controlled based on the volume of material being fed, the weight of material being fed or the loss-in-weight of the system.

33 Claims, 4 Drawing Sheets

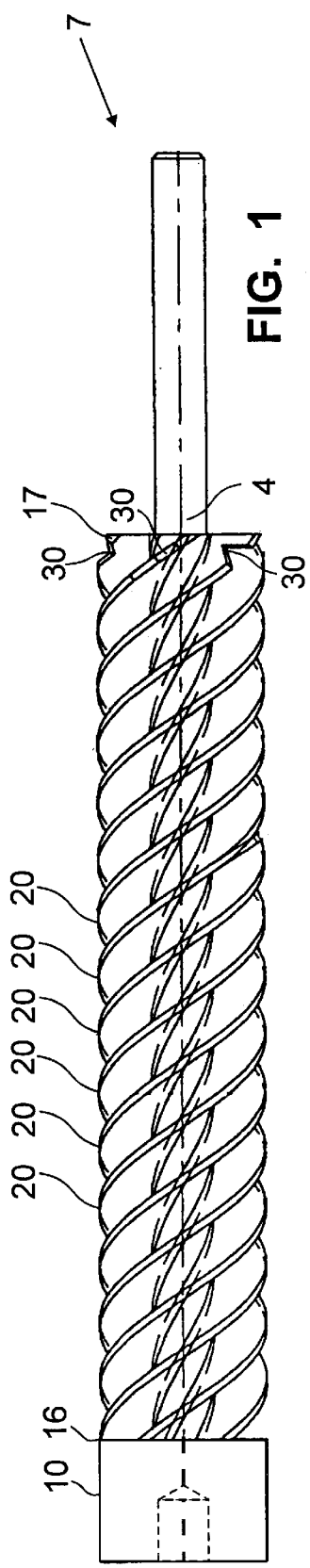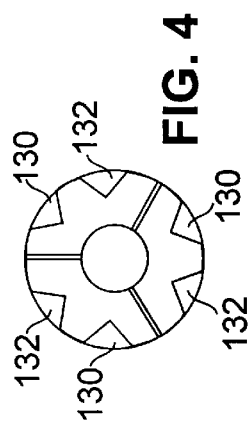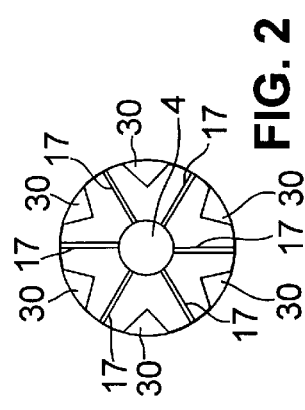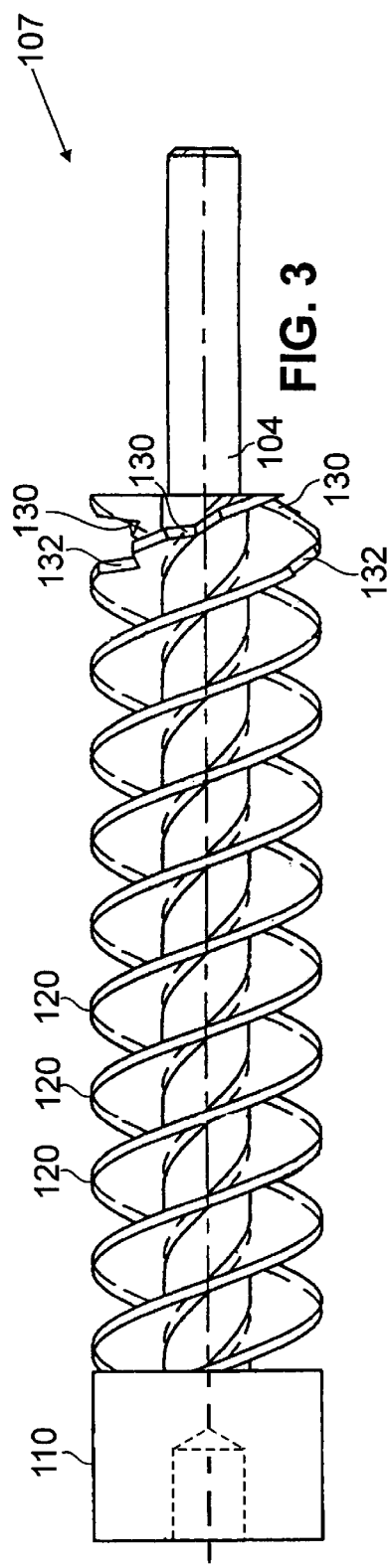

MULTI-FLIGHTED NOTCHED METERING AUGER

BACKGROUND OF THE INVENTION

1. Field of the Invention

The invention relates generally to augers which are used to produce a flow of material within an enclosure and particularly to augers used in moving dry solids through a feeding system. The invention also relates to material handling and feeding systems that use such an auger.

2. Description of the Prior Art

Material feeding systems utilize various types of mechanical components, including augers, to move material from the body of the feeding system to a discharge opening at a predetermined rate. Two types of common feeding systems are volumetric feeding systems and gravimetric feeding systems. Volumetric feeding systems control the discharge rate based on the speed of the auger and its volumetric displacement (volume output per revolution). Gravimetric feeding systems control the discharge rate based on weight.

Common materials used in material feeding systems are dry solids, typically including powders, granules, strands, etc. Such solids, especially those which are adhesive, cohesive, fibrous, or hygroscopic, sometimes cause process variations because of the tendency of the common auger to produce uneven or nonuniform flow. A nonuniform (pulsating) flow can inhibit flow-dependent processes beyond the feeding system. Thus, the short-term efficiency and effectiveness of the metering apparatus is impaired. It is, thus, highly desired that, for many processes, the flow of material through the discharge outlet by the auger be as uniform as possible.

The nonuniform flow of material in a dry solids feeding system is primarily due to the speed of the auger combined with the size of the gate openings (flights) of the auger. Material clumps together causing it to be delivered out of the feeding system in "pulses" at different rates and in different size chunks. This problem is exacerbated at slower speeds where the pulses are farther apart and produce even larger chunks of material. The number of pulses that are generated typically depends on the number of flights on the auger. Conventionally, augers typically have one flight, and thus, deliver only one pulse per rotation. This results in an uneven flow of material. Intermeshing twin or double augers produce two pulses per revolution.

One auger which attempts to overcome these problems is disclosed in U.S. Pat. No. 4,206,841 to Lundgren. Lundgren discloses a screw conveyer which extends through a barrel to drive material from an inlet at one end of the barrel to an outlet at the other end of the barrel when the screw is rotated. The screw has a central stem with a single flight extending along its length. A plurality of blade segments are mounted at the discharge end of the screw. Each blade segment has a base portion attached at its inner periphery to the central stem and a wing portion distal to the stem. The wing portion defines an arc larger than the base portion so that each blade segment defines an open space between its inner periphery and the central stem. In addition, each blade segment has a pitch that may vary from that of the single flight.

There remains, however, the need for a simple auger that can feed material uniformly at a variety of operating speeds.

SUMMARY AND OBJECTS OF THE INVENTION

It is therefore an object of the present invention to provide a simple auger that is capable of feeding materials, in particular dry solid materials, uniformly at a variety of operating speeds.

It is a further object of the present invention to provide a material feeding apparatus having a simple auger that is capable of feeding materials, in particular dry solid materials, uniformly at a variety of operating speeds.

These and other objects of the present invention are accomplished by an auger which has a shaft from which extends at least one flight for conveying material from a first end of the shaft to a second end of the shaft upon rotation of the auger. The auger further comprises at least one notch in the outer perimeter of the flight proximate to the second end of the shaft.

In another aspect of the present invention, the above auger is used in a material feeding system. The feeding system has a supply hopper and a discharge conduit mounted to a feed trough. The auger, described above, is disposed in the trough and extends into the discharge conduit. The auger is rotated by a motor to drive the material from the feed trough through the discharge spout. The speed of the motor (and hence the feed rate of the material) may be controlled based on the volume of material being fed, the weight of material being fed or the loss-in-weight of the system.

BRIEF DESCRIPTION OF THE DRAWINGS

The invention will now be described in detail with reference to the accompanying drawings in which:

FIG. 1 is a side elevational view of a six flighted auger according to the present invention;

FIG. 2 is an end elevational view of the discharge end of the auger of FIG. 1;

FIG. 3 is a side elevated view of a three flighted auger in an alternative embodiment of the present invention;

FIG. 4 is an end view of the discharge end of the auger of FIG. 3;

DETAILED DESCRIPTION OF THE PREFERRED EMBODIMENT

Figure 5:
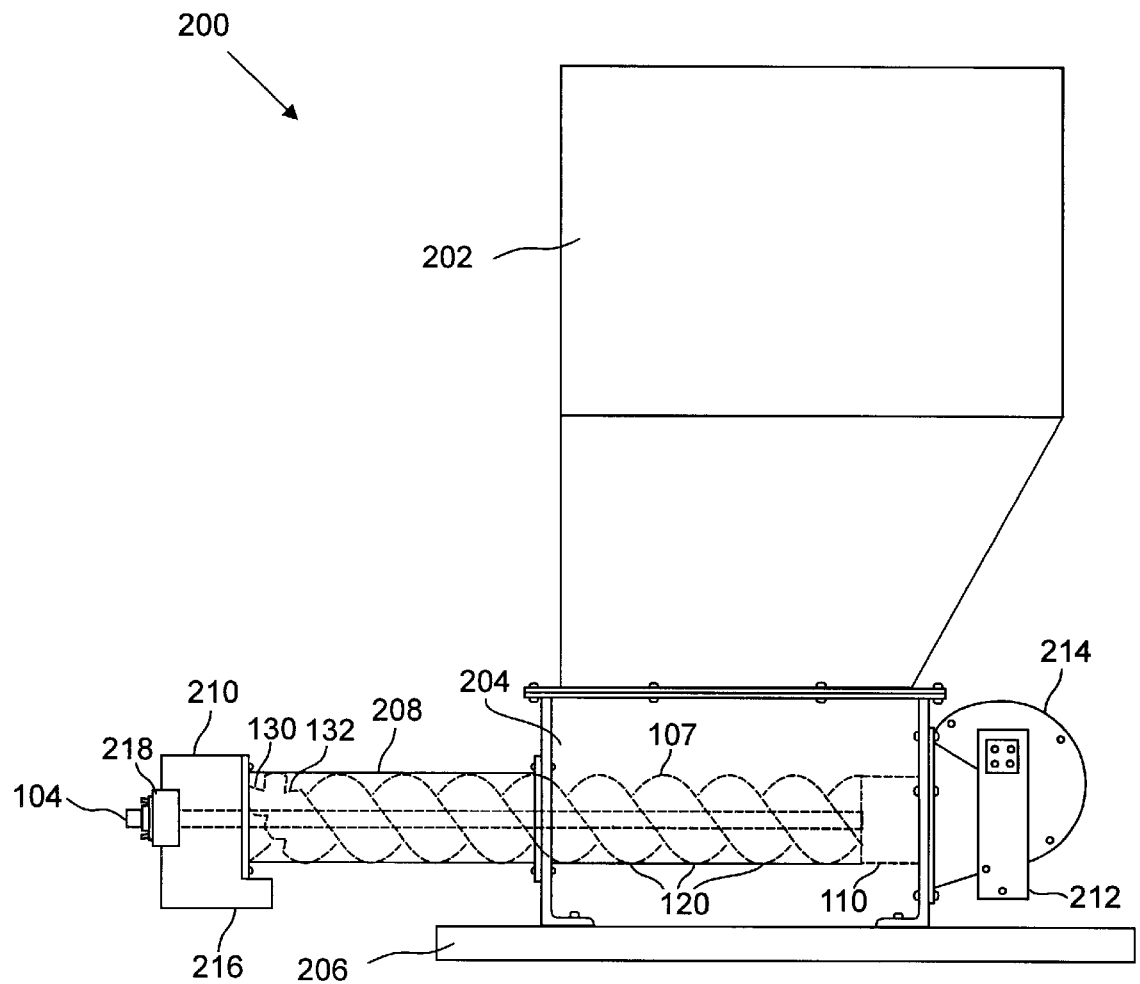
FIG. 5 is a side elevational view of a volumetric feeding system employing the auger of FIG. 3 according to the present invention.

Referring to FIG. 1, a preferred embodiment of the auger of the present invention is shown. The auger 7 is provided with a base 10. From base 10 extends shaft 4. Six flights 20 project outward from shaft 4. Each flight 20 has a first end 16 and a second, discharge end 17. The first end 16 of each flight 20 terminates at base 10.

As best seen in FIG. 2, which is an end elevational view of the discharge end of auger 7, a wedge-shaped notch 30 is cut into the outer perimeter of each flight proximate the discharge end 17 of the flight 20. The notches 30 of a preferred embodiment are wedge-shaped having an angle of 90° at the apex. When viewed from the end, as shown in FIG. 2, it can be seen that the notches do not extend to the shaft. The notches define an arc of about 30° in the outer perimeter of the auger. It should be apparent, however, that notches of other shapes (e.g., semi-circles, rectangles, etc.) and other sizes may be used and still practice the present invention.

Preferably, each notch 30 is positioned radially about the shaft 4 so as to be centered between adjacent flight ends 17. This produces a discharge pulse of material at a point half-way between those produced by the adjacent flight ends 17 as the auger 7 is rotated. For example, in the auger 7 of FIG. 2, the flights 20 terminate at 60° intervals around the shaft 4, beginning at 0° (i.e., top of the figure). The notches 30 are also spaced at 60° intervals, but with the first notch centered at approximately 30°. Accordingly, the notches 30 are centered between adjacent flight ends 17 and symmetrically positioned about the shaft 4. This arrangement has been found to provide a very uniform flow of material since the notches 30 and flight ends 17 produce multiple discharge pulses at equal intervals as the auger 7 is rotated.

The auger 7 is machined out of a solid bar of steel. The outer diameter of the auger 7 can typically range from 1 to 8 inches and the outer diameter of the shaft will vary proportionately. The length of the auger is dependent upon the application. The flights are typically each ⅛ to ¼ inch thick and have a pitch proportional to its size. The auger 7 of FIGS. 1 and 2 has an outer diameter of 2 inches, a shaft outer diameter of ¾ inch and a flight thickness of ⅛ inch.

FIGS. 3 and 4 show an alternative embodiment of the present invention. Similar to auger 7 of FIGS. 1–2, auger 107 consists of a base 110 and a shaft 104 fixed to the base 110. However, the auger 107 of FIGS. 3 and 4 includes only three flights 120, rather than six. Each flight 120, therefore, terminates at 120° intervals beginning at 0°. In addition, as seen in FIG. 4, each flight 120 has two notches 130, 132 cut into its outer perimeter proximate the discharge end of the flight. The notches 130, 132 are similar to those in the six flighted auger but are spaced about shaft 104 at different intervals to account for the different number of flights and notches. Accordingly, if the end of the top flight in FIG. 4 is taken as 0°, the two notches 130, 132 in the first flight are centered at 36° and 84°, respectively, the notches 130, 132 in the second flight are centered at 156° and 204°, respectively, and the notches 130, 132 in the last flight are centered at 276° and 324°, respectively.

Referring to FIG. 5, the three-flighted auger 107 is illustrated in phantom as a part of a conventional volumetric dry solids feeding system 200. Acceptable volumetric feeding systems are commercially available from Acrison, Inc., 20 Empire Boulevard, Moonachie, N.J. 07074, for example Acrison Model 130. The feeding system includes a material supply hopper 202 mounted to a feed trough 204, which in turn is mounted to a base 206. The supply hopper 202 is mounted above the feed trough 204 such that material flows from the supply hopper 202 into the feed trough 204. The auger 107 is disposed longitudinally in the feed trough 204 with its base 110 connected via gear assembly 212 to motor 214, which causes rotation of the auger 107 within the trough 204. The auger 107 extends out one end of the feed trough 204 into a discharge conduit 208 which is also mounted to the feed trough 204. The flights 120 of the auger terminate at the end of the discharge conduit 208.

A discharge spout 210 having opening 216 is mounted to the end of the discharge conduit 208. The shaft 104 is connected to the discharge spout 210 by bearing assembly 218. This mounting arrangement helps maintain the axial alignment of the auger 107 and the discharge conduit 208. It should be noted, however, that the discharge spout 210 is not required for the proper operation of the system. In the absence of the discharge spout 210, the shaft 104 could terminate at the end of the discharge conduit 208.

In operation, the motor 214 causes the controlled rotation of the auger 107. This, in turn, causes the material fed from supply hopper 202 to be driven from the feed trough 204, through the discharge conduit 208 and out opening 216 of the discharge spout 210. The volume of material fed per revolution of the particular auger 107 is predetermined so that the desired amount of material to be fed may be controlled by varying the speed of the motor 214. The speed of the motor 214 is controlled in a conventional manner by a variable speed motor controller, for example Model 060 SCR/DC DC motor controller available commercially from Acrison, Inc., as is well known in the art.

Where even greater accuracy is desired, an auger according to the present invention may be used in a gravimetric feeding system. Gravimetric systems control the feeding of material by weight, and thereby compensate for changes in density, for irregular product density and/or for irregular flow or handling characteristics.

Figure 7:
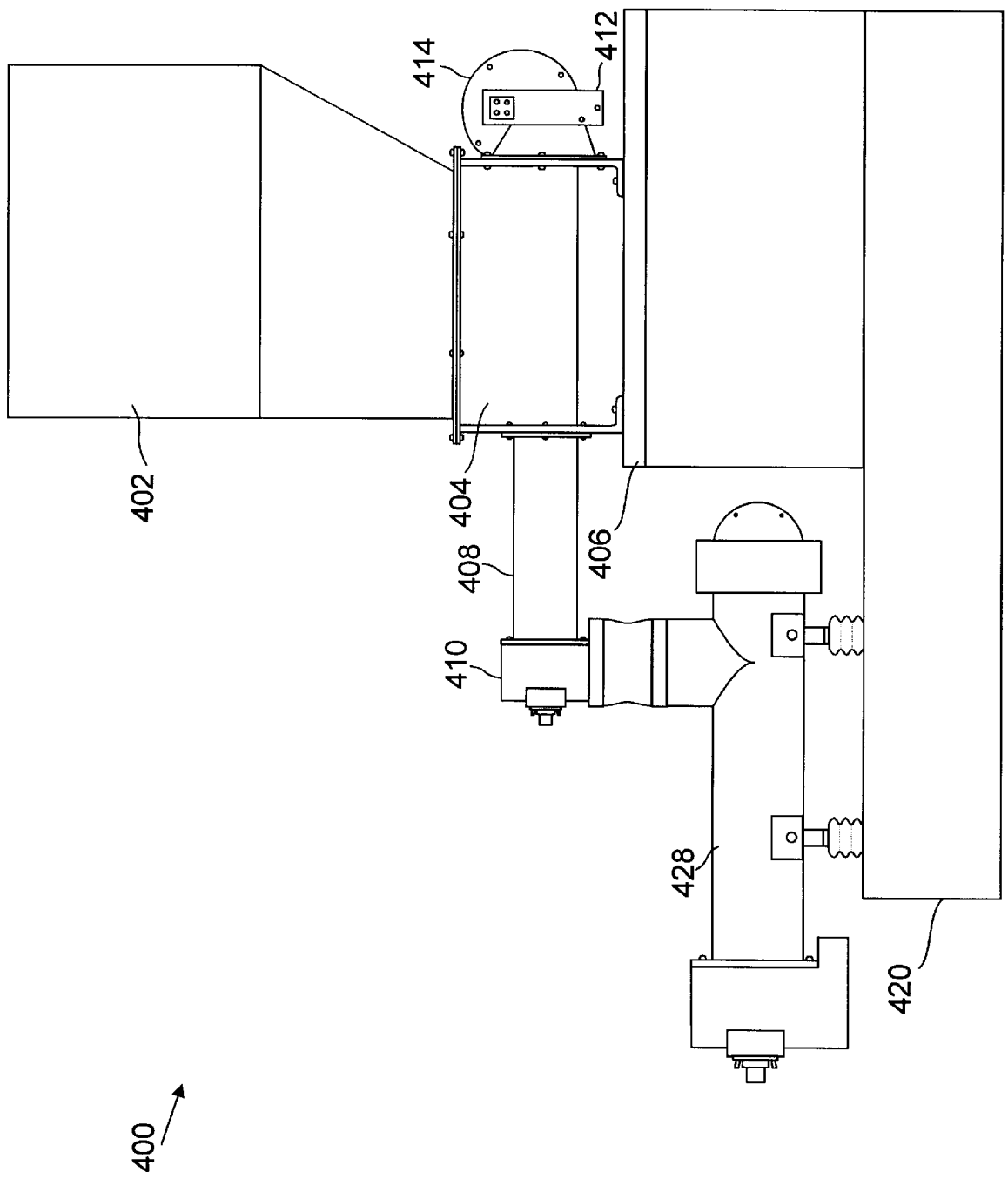
FIG. 7 is a side elevational view of a weigh auger weigh feeding system employing the auger of FIG. 3 according to the present invention

One type of gravimetric feeding system is a weigh auger weigh feeding system, such as the Model 203B Series weigh auger weigh feeding system available from Acrison, Inc. Referring to FIG. 7, the weigh auger feeding system 400 has a supply hopper 402 mounted to a feed trough 404, which in turn is mounted to a base 406, similar to the volumetric feeding system 200 described above. Also as in the volumetric feeding system 200, the auger 107 is disposed longitudinally in the feed trough 404, is connected via gear assembly 412 to motor 414 and extends into discharge conduit 408. The weigh auger feeding system differs from the volumetric feeding system 200, however, in that the weigh auger system 400 includes a scale 420 which measures the weight of the material discharged from the discharge conduit 408 as it passes across an auger in a second discharge conduit 428 during operation. This measured weight is compared to an expected or "set" weight, by for example an MD-II 2000™ Weigh Feeder Controller available from Acrison, Inc., causing the generation of a control signal. The control signal is input into the motor controller (described above) to either increase, decrease or maintain the speed of the feed motor 414 and achieve the desired feed rate.

Figure 6:
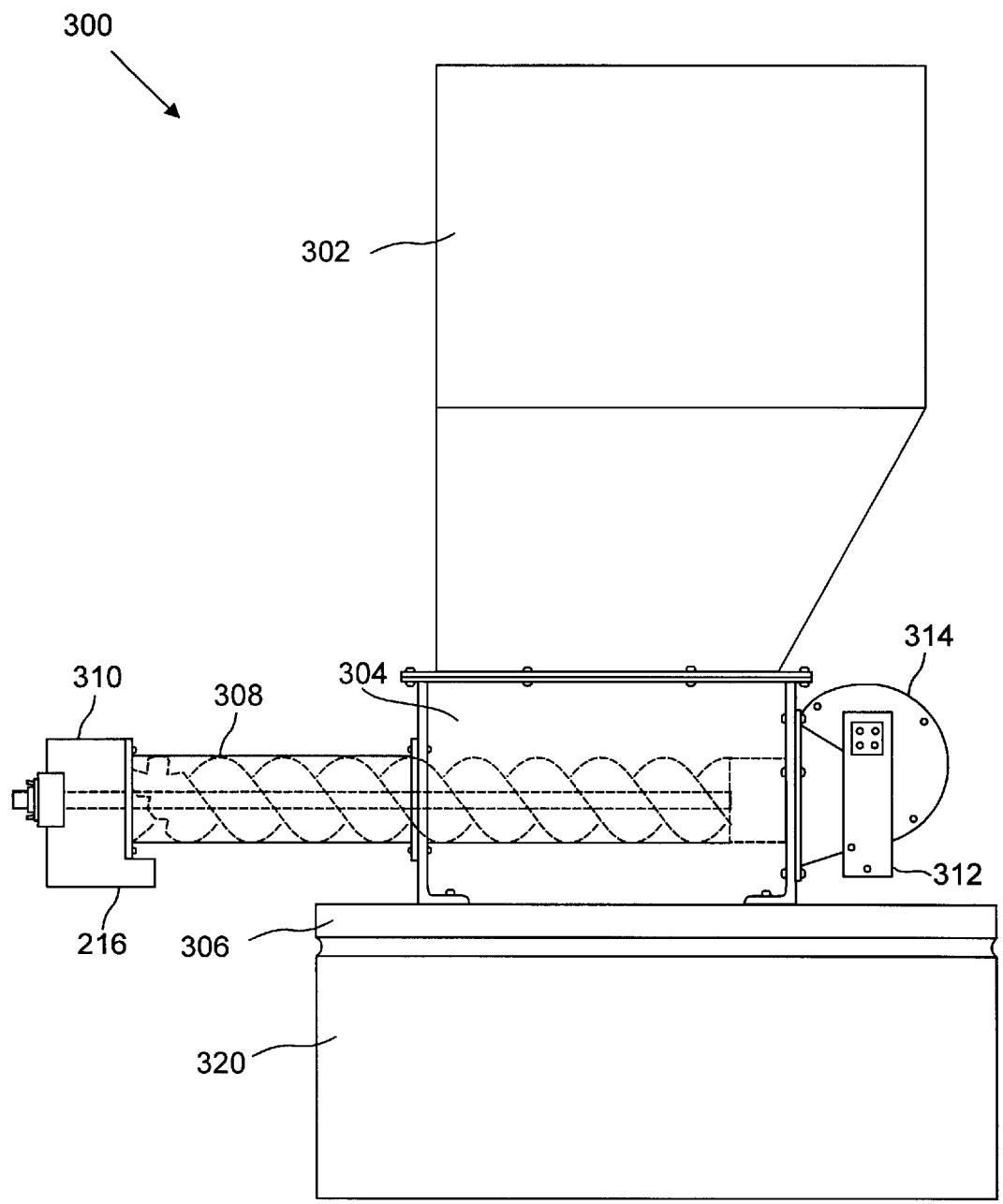
FIG. 6 is a side elevational view of a loss-in-weight weigh feeding system employing the auger of FIG. 3 according to the present invention.

Another type of gravimetric feeding system is referred to as a loss-in-weight weigh feeding system. One such commercially available example is the Model 404 loss-in-weight weigh feeding system, also available from Acrison, Inc. In loss-in-weight feeding systems, the entire apparatus 300 is mounted on a weighing mechanism or scale 320, for example at its base 306 as shown in FIG. 6. The scale 320 continuously monitors the weight of the entire system, including feed trough 304, discharge conduit 308, spout 310, supply hopper 302 and the material being fed, so that the loss in weight caused by the discharge of material can be continually tracked. The amount of material to be fed may then be accurately controlled by varying the speed of the motor in response to the rate of weight loss of the system. Again, the manner in which the feed rate of material is controlled in a loss-in-weight feed system is well known in the art and may include, for example, the MD-II 2000 Weigh Feeder Controller and Model 060 SCR/DC DC motor controller as described above.

The augers of the present invention produce a multiple number of pulses per revolution as compared to the conventional single or double augers which only produce one or two pulses per revolution, respectively. The six flighted auger of FIGS. 1–2 generates twelve pulses per rotation while the auger of FIGS. 3–4 generates nine pulses per rotation. Consequently, the pulses produced by the auger of the present invention are smaller, resulting in a more uniform flow of material.

In addition to the increase in the number of discharge pulses, produced by the combination of the number of flights and the number of notches located at the discharge end of the auger, the augers of the present invention generate an overflow of material through the notches. This overflow is produced by the centrifugal or rotational motion of the auger as it discharges material from the discharge end. The overflow created at the notches further enhances the uniformity of the flow of material, which has already been metered. Overall, it has been found that the augers of the present invention deliver material 10–20 times more consistently and accurately than conventional augers at sample intervals as small as 0.1 seconds, while rotating at speeds typically between 20–300 RPM.

It has been found that the ideal operating speed, for the augers of the present invention, is usually between 20 and 300 RPM. At these speeds, the wear and tear on both the auger and related machinery is minimized. It should be noted, however, that the augers of the present invention are in no way limited to these range of speeds.

The present invention has been described in terms of preferred embodiments thereof. Other embodiments, features and variations within the scope of the invention will, given the benefit of this disclosure, occur to those having ordinary skill in the art.

What is claimed is:

1. An auger for feeding material comprising:
   a shaft; and
   a plurality of flights mounted to said shaft, each of said flights having a flight end and at least one notch proximate said flight end,
   wherein said flight ends and said notches are radially disposed about said shaft so as-to produce discharge pulses of material at equal intervals when said auger is rotated.

2. The auger of claim 1 wherein said notches are radially disposed about said shaft so as to be centered between the flight ends.

3. The auger of claim 1 wherein the number of flights is 3.

4. The auger of claim 3 wherein each of said flights has two notches.

5. The auger of claim 4 wherein said flight ends are disposed at 0°, 120° and 240° relative to each other about said shaft and said notches are disposed at approximately 36°, 84°, 156°, 204°, 276° and 324° relative to each other and relative to said flight ends about said shaft.

6. The auger of claim 1 wherein the number of flights is 6.

7. The auger of claim 6 wherein each of said flights has one notch.

8. The auger of claim 7 wherein said flight ends are disposed at 0°, 60°, 120°, 180°, 240° and 300° relative to each other about said shaft and said notches are disposed at approximately 30°, 90°, 150°, 210°, 270° and 330° relative to each other and relative to said flight ends about said shaft.

9. The auger of claim 1 wherein said at least one notch is wedge shaped.

10. The auger of claim 9 wherein said at least one notch has an apex having approximately a 90° angle.

11. A material feeding system comprising:
    material supply means;
    an auger disposed in said material supply means for driving material to a discharge opening in said supply means;
    a plurality of flights mounted to said auger and terminating at said discharge opening, each of said flights having at least one notch proximate said discharge opening; and
    means to rotate said auger.

12. The feeding system of claim 11 wherein said material supply means comprises:
    a feed trough; and
    a supply hopper mounted above the feed trough.

13. The feeding system of claim 12 wherein said material supply means further comprises:
    a discharge conduit mounted to said feed trough; and
    a discharge spout mounted to said discharge conduit distal from said feed trough, wherein said discharge opening is located in said discharge spout.

14. The feeding system of claim 11 wherein said rotation means comprises a motor operably connected to said auger.

15. The feeding system of claim 14 further comprising means to control the speed of said motor to feed a desired volume of said material.

16. The feeding system of claim 14 further comprising:
    means to measure a weight of the material; and
    means to control the speed of said motor to feed a desired quantity of said material based on weight.

17. The feeding system of claim 16 wherein said weight measuring means comprises:
    means to measure a weight of the feeding system including the material; and
    means to determine a loss-in-weight of said feeding system and said material due to said material being fed.

18. The feeding system of claim 11 wherein said flights terminate at flight ends, and wherein said notches are radially disposed about said shaft so as to be centered between the flight ends.

19. The feeding system of claim 11 wherein the number of flights is 3.

20. The feeding system of claim 19 wherein each of said flights has two notches.

21. The feeding system of claim 11 wherein the number of flights is 6.

22. The feeding system of claim 21 wherein each of said flights has one notch.

23. The feeding system of claim 11 wherein said notches are wedge shaped.

24. The feeding system of claim 23 wherein said notches have an apex having approximately a 90° angle.

25. A material feeding system comprising:
    an auger having a plurality of flights, each of said flights having a flight end;
    means for supplying a material to be fed to said auger;
    means for rotating said auger such that each flight end produces a discharge pulse;
    means for producing at least one additional discharge pulse of material between said pulses produced by said flight ends.

26. A material feeding system comprising:
    a discharge conduit having a discharge end;
    an auger extending into said discharge conduit for driving material toward said discharge end, said auger comprising;
    a shaft; and
    a plurality of flights mounted to said shaft and terminating at said discharge end, each of said flights having at least one notch proximate said discharge end; and
    a motor operably engaged to said auger.

27. The feeding system of claim 26 further comprising:
    a feed trough mounted to said discharge conduit; and
    a supply hopper mounted above said feed trough.

28. The feeding system of claim 11 further comprising a discharge spout mounted to said discharge conduit distal from said trough.

29. The feeding system of claim 28 wherein said shaft is rotationally mounted to said discharge spout.

30. A method of feeding a material with an apparatus having a discharge conduit having a discharge end, and an auger extending into said discharge conduit, said auger having a shaft, and a plurality of flights mounted to said shaft terminating at said discharge end, each of said flights having at least one notch proximate said discharge end, the method comprising the steps of:

provide a supply of material to be fed to said auger; and rotating said auger so as to drive said material through said discharge conduit toward said discharge end and discharging said material from said discharge end in a plurality of pulses, wherein the number of pulses produced is greater than the number of flights.

31. The method of claim 20 further comprising the step of varying the speed of rotation of the auger to feed a desired volume of said material.

32. The method of claim 30 further comprising the steps of:

monitoring the weight of said material as it is driven by said auger; and varying the speed of rotation of the auger to feed a desired quantity of said material based on weight.

33. The method of claim 25 further comprising the steps of:

monitoring a loss-in-weight of said material feeding apparatus and said material; and varying the speed of rotation of the auger to feed a desired quantity of said material based on the loss in-weight.

* * * * *